{12} United States Patent
Mizukoshi et al.

(10) Patent No.: US 10,569,670 B2
(45) Date of Patent: Feb. 25, 2020

(54) SEAT LIFTER STRUCTURE AND VEHICLE SEAT EQUIPPED WITH THE SAME (71) Applicants: Adient Engineering and IP GmbH, Burscheid (DE); HONDA MOTOR CO., LTD., Tokyo (JP)

(72) Inventors: Toshimitsu Mizukoshi, Saitama (JP); Masaki Shimazu, Saitama (JP); Taiji Misono, Saitama (JP); Hiroyuki Yasui, Kanagawa (JP); Motohiko Ozawa, Kanagawa (JP); Thomas D Novitsky, Plymouth, MI (US)

(73) Assignees: Adient Engineering and IP GmbH, Burscheid (DE); HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/923,550

(22) Filed: Mar. 16, 2018

(65) Prior Publication Data
US 2019/0283631 A1 Sep. 19, 2019

(51) Int. Cl.
B60N 2/12 (2006.01)
B60N 2/16 (2006.01)
B60N 2/18 (2006.01)

(52) U.S. Cl.
CPC ........... B60N 2/1615 (2013.01); B60N 2/165 (2013.01); B60N 2/168 (2013.01)

(58) Field of Classification Search
CPC ............................. B60N 2/1615; B60N 2/168
USPC .................................................... 297/344.17
See application file for complete search history.

(56) References Cited

U.S. PATENT DOCUMENTS

| 4,508,386 A * | 4/1985 | Hofmann | B60N 2/0232 297/344.17 X |
| 6,921,058 B2 * | 7/2005 | Becker | B60N 3/16 297/344.17 X |
| 7,066,540 B2 * | 6/2006 | Minai | B60N 2/1615 297/344.17 X |
| 8,128,147 B1 * | 3/2012 | Kanda | B60N 2/0232 296/65.05 |
| 8,177,280 B2 * | 5/2012 | Yamada | B60N 2/161 297/344.17 X |

(Continued)

FOREIGN PATENT DOCUMENTS

JP 2000-255295 A 9/2000

Primary Examiner — Rodney B White
(74) Attorney, Agent, or Firm — McGlew and Tuttle, P.C.

(57) ABSTRACT

A seat lifter structure which can maintain the engagement of the gear of the sector and the pinion of the brake unit and prevent a fall down of the seat back to a front side, even when a large force to a front side is exerted with respect to the seat back is provided. It raises or lowers a cushion seat (ST1) by raising or lowering a side frame (2) built into the cushion seat (ST1) with respect to a fixing member (61). It is equipped with a brake unit (8) having a pinion (8b) and attached to the side frame (2); a sector (7) supported to be rotatable with respect to the fixing member (61) by a first support portion (7b1), supported to be rotatable with respect to the side frame (2) via a second support portion (7k2), having a gear portion (7a) to be engaged with the pinion (8b) and provided in parallel and facing with respect to the side frame (2); and a spacer (10) having a first surface (10kb) facing with the side frame (2) and a second surface (10ka) facing with the sector (7), which is installed between the side frame (2) and the sector (7).

16 Claims, 6 Drawing Sheets

(56) References Cited

U.S. PATENT DOCUMENTS

| | | | | |
|---|---|---|---|---|
| 8,590,971 | B2* | 11/2013 | Ito | B60N 2/1615 |
| | | | | 297/344.13 |
| 8,616,645 | B2* | 12/2013 | Ito | B60N 2/1615 |
| | | | | 297/344.15 |
| 8,684,462 | B2* | 4/2014 | Brewer | B60N 2/0232 |
| | | | | 297/344.17 |
| 2009/0218868 | A1* | 9/2009 | Koga | B60N 2/1839 |
| | | | | 297/344.17 |
| 2010/0001569 | A1* | 1/2010 | Shinozaki | B60N 2/1615 |
| | | | | 297/344.15 X |
| 2014/0224553 | A1* | 8/2014 | Ozawa | B60N 2/002 |
| | | | | 177/136 |
| 2016/0059752 | A1* | 3/2016 | Kishida | F16H 57/039 |
| | | | | 297/344.12 |
| 2017/0028890 | A1* | 2/2017 | Matsui | B60N 2/68 |
| 2017/0028892 | A1* | 2/2017 | Matsui | B60N 2/682 |
| 2017/0203677 | A1* | 7/2017 | Becker | B60N 2/933 |

\* cited by examiner

//cdn.mathpix.com/cropped/2025_09_19_1b65ec9f8b1f9d7a8e5ag.jpg?height=... 
SEAT LIFTER STRUCTURE AND VEHICLE SEAT EQUIPPED WITH THE SAME

FIELD OF THE INVENTION

The present invention relates to a seat lifter structure and a vehicle seat equipped with the same.

BACKGROUND OF THE INVENTION

As a seat lifter structure applicable to a vehicle seat having a cushion seat and a seat back, a structure as described in the Patent Document 1 has been known.

The seat lifter structure as described in the Patent Document 1 is equipped with a brake unit having a pinion and fixed to a seat mount bracket side that moves up and down, and a sector arranged in parallel to the seat mount bracket and rotates in coordination with its up and down motion, where it is made such that a braking is applied to the up and down motion of the seat mount bracket by engaging in advance a gear provided on the sector with the pinion.

Patent Document 1: Japanese Patent Application Publication No. 2000-255295

In the case where the seat is mounted on a vehicle body of a vehicle, in the conventional seat lifter structure, a gap is provided between the sector and the seat mount bracket that is arranged in parallel on an outer side in a width direction of the vehicle with respect to the sector.

For this reason, when a large force to a rear side is exerted with respect to the seat back, the seat mount bracket is easily approaching to the sector side and deforming such that the gap with the sector arranged on an inner side is filled, and in conjunction with that approaching and deforming, it is expected that the sector is also deformed to the inner side.

When these deformations occur, a relative position of the gear of the sector and the pinion of the brake unit fixed to the seat mount bracket will be displaced, and there is a danger for causing a trouble in a raising/lowering operation of the seat.

Also, in the case where the vehicle is collided from behind, it has been impossible to deny a possibility of causing a fall down of the seat back to a rear side as the deformations of the sector and the seat mount bracket occur excessively due to a large impact load.

SUMMARY OF THE INVENTION

Therefore, the present invention has an object of providing a seat lifter structure and a vehicle seat equipped with the same, which can maintain the engagement of the gear of the sector and the pinion of the brake unit and prevent a fall down of the seat back to a rear side, even when a large force to a rear side is exerted with respect to the seat back.

In order to achieve the above noted object, the present invention has the following structure.

1) A seat lifter structure for raising or lowering a cushion seat by raising or lowering a side frame built into the cushion seat with respect to a fixing member, the seat lifter structure having:
   a brake unit having a pinion and attached to the side frame;
   a sector supported to be rotatable with respect to said fixing member by a first support portion, supported to be rotatable with respect to said side frame via a second support portion, having a gear portion to be engaged with said pinion and provided in parallel and facing with respect to said side frame; and
   a spacer having a first surface facing with said side frame and a second surface facing with said sector, which is installed between said side frame and said sector.
2) The seat lifter structure as described in 1), wherein said sector has an arc shaped opening portion centered around said second support portion, and said spacer is attached to said side frame while having a protruding portion to be entered into and engaged with said opening portion.
3) The seat lifter structure as described in 2), wherein said protruding portion has an edge face portion to be abutted to an end surface on an outer edge portion of said opening portion by surfaces.
4) The seat lifter structure as described in any one of 1) to 3), equipped with a cover fixed with respect to said side frame so as to cover said sector, said cover having a bead portion protruding to contact with or face in proximity with a surface of said sector.
5) A vehicle seat mounted on a vehicle and having a cushion seat and a seat back, wherein the vehicle seat is equipped with a seat lifter structure attached to a rail fixed on a floor of said vehicle and to be raised or lowered with respect to said rail, and said seat lifter structure is made to be the seat lifter structure as described in any one of 1) to 4).

According to the present invention, it is possible to maintain the engagement of the gear of the sector and the pinion of the brake unit and prevent a fall down of the seat back to a rear side, even when a large force to a rear side is exerted with respect to the seat back.

DETAILED DESCRIPTION OF THE INVENTION

A vehicle seat equipped with a seat lifter structure according to an embodiment of the present invention will be explained by way of practical examples of a seat lifter structure LK and a seat ST equipped with the seat lifter structure LK.

Figure 1:
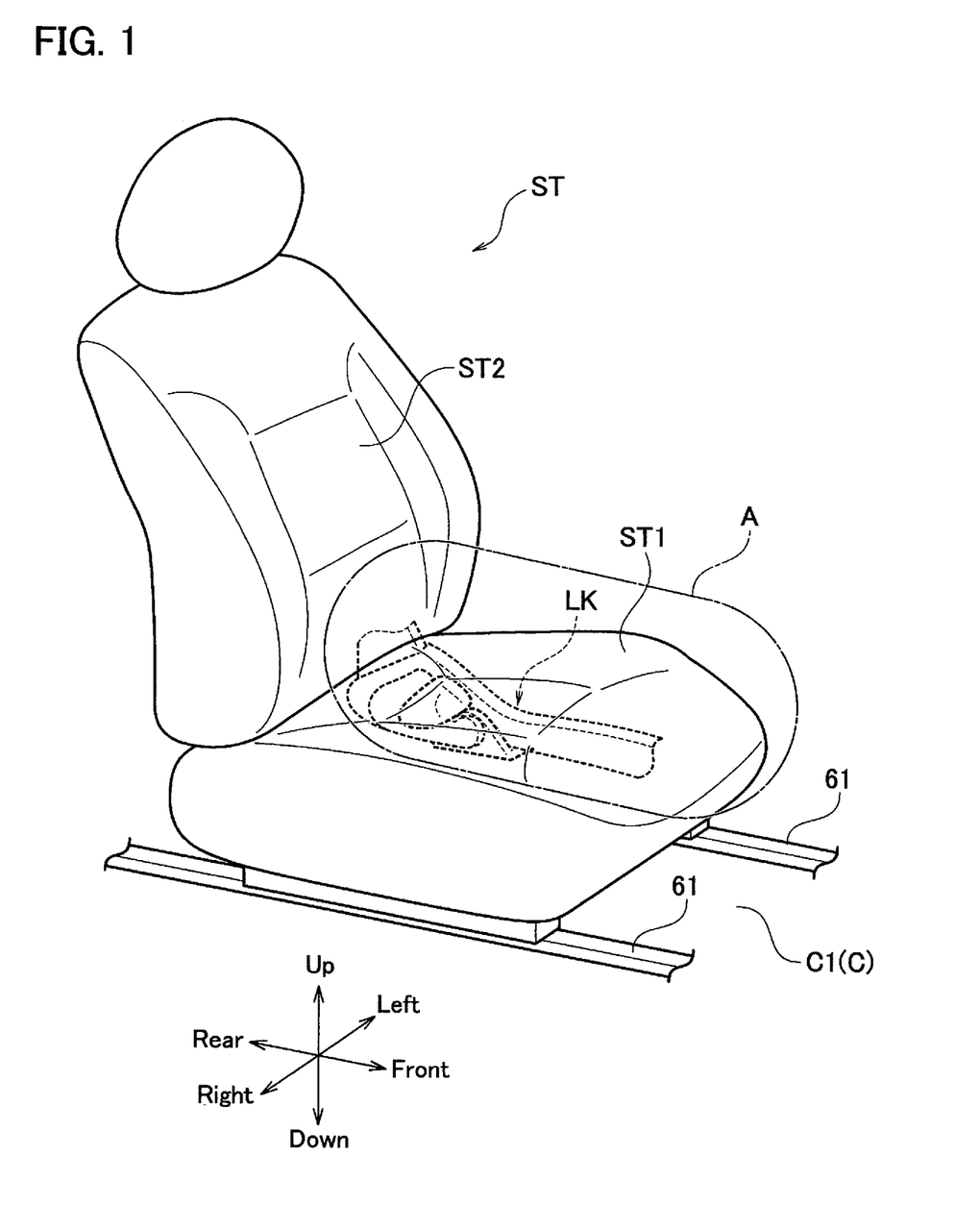
FIG. 1 is a perspective view for explaining a vehicle seat ST equipped with a seat lifter structure according to an embodiment of the present invention.

FIG. 1 is an outward appearance perspective view of the seat ST. In the following explanation, respective directions of front, rear, left, right, up and down will be defined based on a state in which the seat ST is mounted on a vehicle body C, by arrows shown in FIG. 1. A left and right direction will also be referred to as a width direction.

As shown in FIG. 1, the seat ST has a cushion seat ST1 and a seat back ST2.

The seat ST is attached to be capable of moving in a front and rear direction by a known sliding structure, with respect to a pair of rails 61, 61 as fixing members installed on a floor surface C1 of the vehicle body C of the vehicle.

Also, the seat ST has the seat lifter structure LK for enabling the cushion seat ST1 and the seat back ST2 to be raised or lowered with respect to the floor surface C1.

Figure 2:
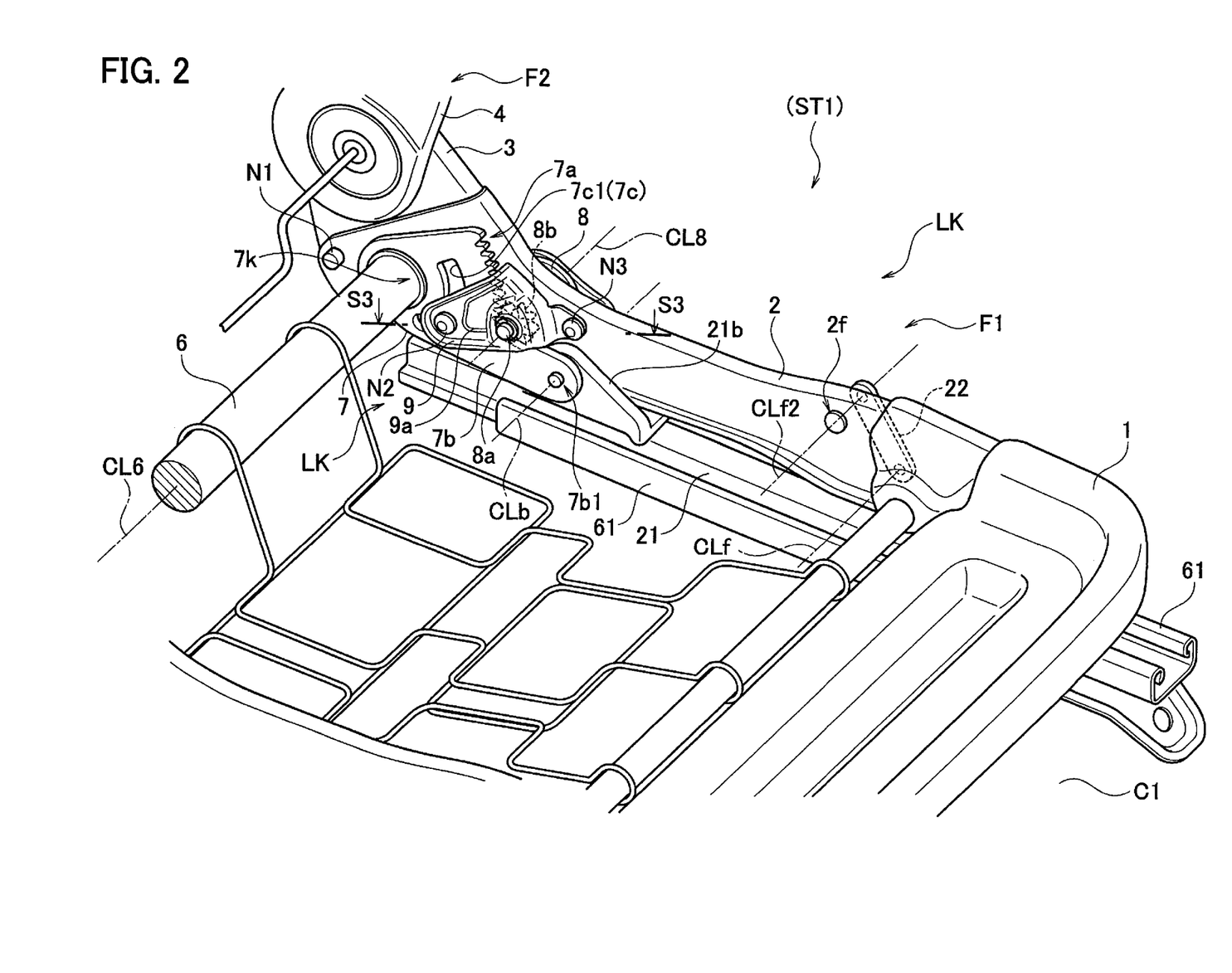
FIG. 2 is a partial perspective view for explaining a seat lifter structure LK in the vehicle seat ST.

FIG. 2 is a diagram for explaining an internal frame structure at a portion A in FIG. 1, which is a perspective view looked from an almost identical viewpoint as FIG. 1.

For FIG. 2, an outline will be explained first.

In FIG. 2, as a frame F1 of the cushion seat ST1, a part of a front frame 1 extending to left and right at a front portion of the cushion seat ST1, a left side frame 2 among a pair of side frames extending to a rear side from left and right ends of the front frame 1, and a relay panel 3 connected to a rear end portion of the side frame 2, are shown.

As a frame F2 of the seat back ST2, a part of a seat back side frame 4 supported to be freely rotatable with respect to the relay panel 3 is shown.

The relay panel 3 and the side frame 2 are integrated by a screw N1 and the like.

Figure 3:
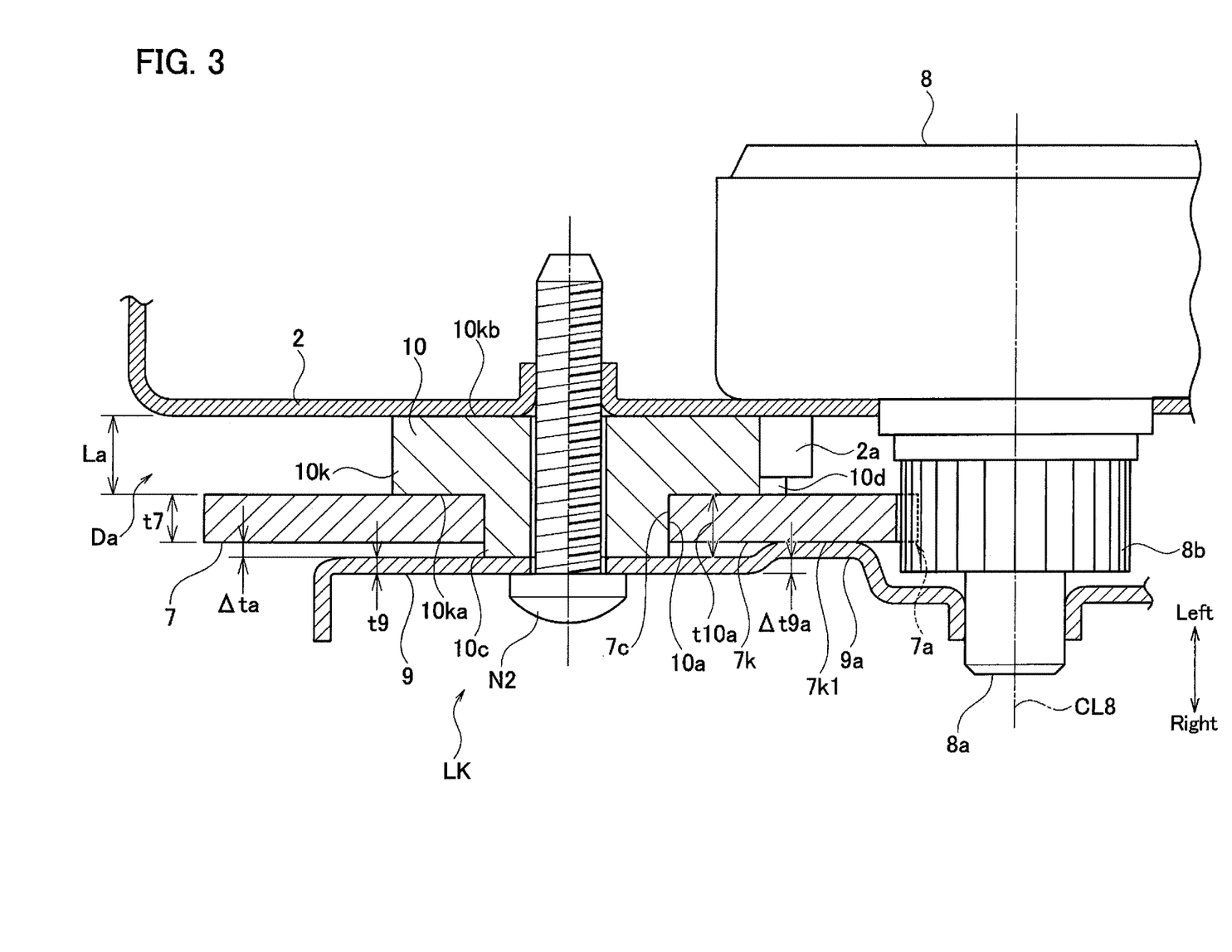
FIG. 3 is a cross sectional view for explaining the seat lifter structure LK.

Next, the detail of the seat lifter structure LK will be explained with references to FIG. 2 and FIG. 3. FIG. 3 is a cross sectional view at a S3-S3 position in FIG. 2.

The side frame 2 is supporting a rear portion shaft 6 extending in a left and right direction to be freely rotatable, at a rear portion.

On a left side portion in the rear portion shaft 6, a sector 7 is fixed by welding or riveting and the like, with a gap Da (see FIG. 3) of a prescribed distance La in a left and right direction between it and the side frame 2.

Namely, the sector 7 is arranged in parallel and facing with respect to the side frame 2, with the gap Da. The sector 7 has a base portion 7k extended to a front upper side.

The base portion 7k has a gear portion 7a which is an arc shaped partial gear centered around an axial line CL6 of the rear portion shaft 6 at a tip end, and an arc shaped opening portion 7c centered around the axial line CL6 at an intermediate portion.

In correspondence to surrounding of the opening portion 7c of the sector 7, between the sector 7 and the side frame 2, a base portion 10k of a spacer 10 is installed.

Also, in the opening portion 7c, a protruding portion 10a of the spacer 10 is engaged and entered to be capable of moving within the opening portion 7c.

The spacer 10 will be explained with references to FIG. 4 and FIG. 5.

Figure 4:
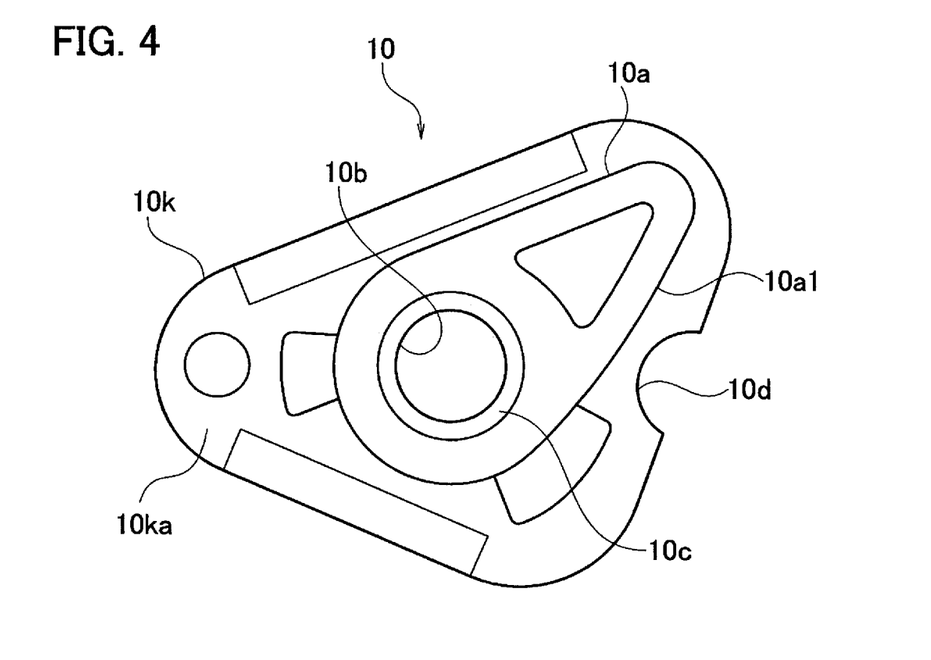
FIG. 4 is a plan view for explaining a spacer 10 contained in the seat lifter structure LK.
Figure 5:
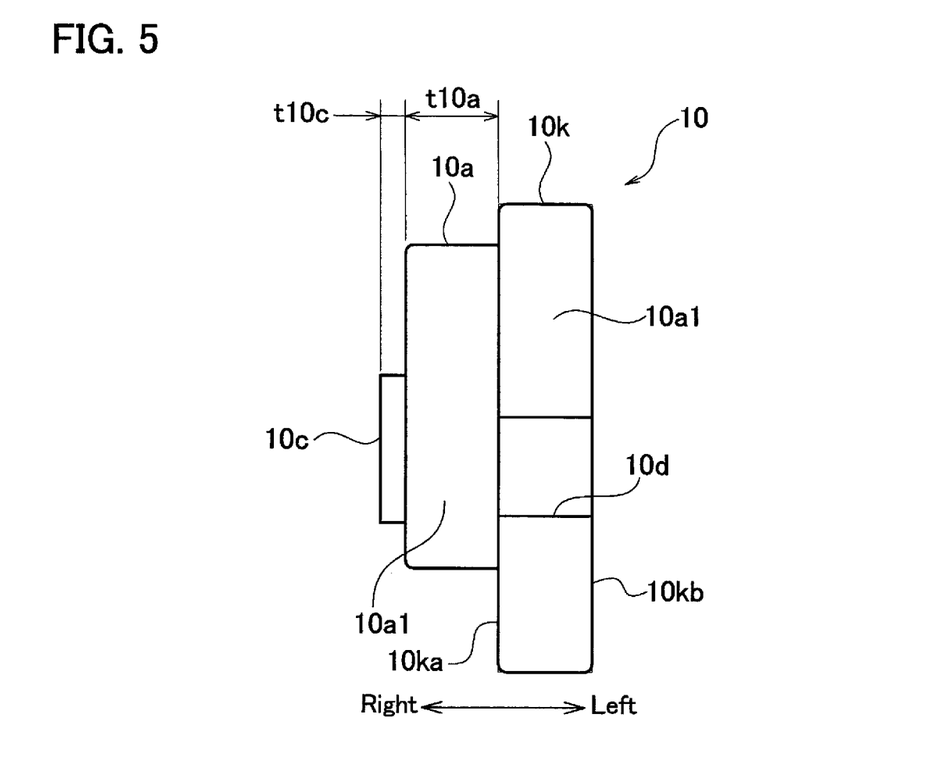
FIG. 5 is a side view for explaining the spacer 10.

FIG. 4 and FIG. 5 are the plane view and the right side view of the spacer 10 respectively.

A left and right direction shown in FIG. 5 is corresponding to the left and right direction of FIG. 2 and FIG. 3.

The spacer 10 has the base portion 10k whose plan view is in an approximately triangular shape, the protruding portion 10a protruding such that its plan view is in a water drop shape between a central portion and one corner portion of a right surface 10ka of the base portion 10k. The right surface 10ka is a surface facing with the sector 7.

In the central portion, a piercing hole 10b piercing through the base portion 10k and the protruding portion 10a is formed.

A left surface 10kb of the base portion 10k is made to be a flat surface facing with the side frame 2.

A thickness t10a which is a protruding height of the protruding portion 10a is formed to be larger than a thickness t7 of the sector 7 by Ata (see FIG. 3).

Also, at an edge portion of the piercing hole 10b on a surface of the protruding portion 10a, a ring shaped protruding portion 10c that is further protruding is formed.

A protruding height t10c of the ring shaped protruding portion 10c is set to be nearly equal to a thickness t9 of a cover 9 (to be described in detail later) (see FIG. 3).

An edge surface portion 10a1 on right side in FIG. 4 of the protruding portion 10a is formed as a curved surface with the same curvature as an outer edge 7c1 of the opening portion 7c of the sector 7 (see FIG. 2 and FIG. 3).

At a center in a circumferential direction of the edge surface portion 10a1, a concave portion 10d carved to be extending in an arc shape in a thickness direction is formed.

Returning to FIG. 3, on an outer surface (right side surface) of the side frame 2, a brake unit 8 is arranged on an axial line CL8 extending in a left and right direction.

A shaft portion 8a to be an output shaft of the brake unit 8 is protruding to an inner side (right side) by piercing through the side frame 2. On a protruding portion of the shaft portion 8a, a pinion 8b is provided.

To the pinion 8b, the gear portion 7a of the sector 7 is engaged.

The brake unit 8 is made to rotate the pinion 8b stepwise as a passenger operates a raising/lowering lever not shown in the figure.

The brake unit 8 has a built-in brake mechanism (not shown in the figure) for braking so that the pinion 8b is not rotated easily by an external force.

As shown in FIG. 2 and FIG. 3, the cover 9 is fastened and fixed to the side frame 2 from a left side by a screw N2 and a screw N3 (shown only in FIG. 2), so as to cover a central portion in an up and down direction in the base portion 7k of the sector 7 and the pinion 8b. The screw N3 is fastening and fixing the cover 9 directly to the side frame 2.

The screw N2 is inserted into the piercing hole 10b of the spacer 10, and fastening the spacer 10 and the cover 9 together with respect to the side frame 2 so as to fix these three members integrally, as shown in FIG. 3.

Figure 6:
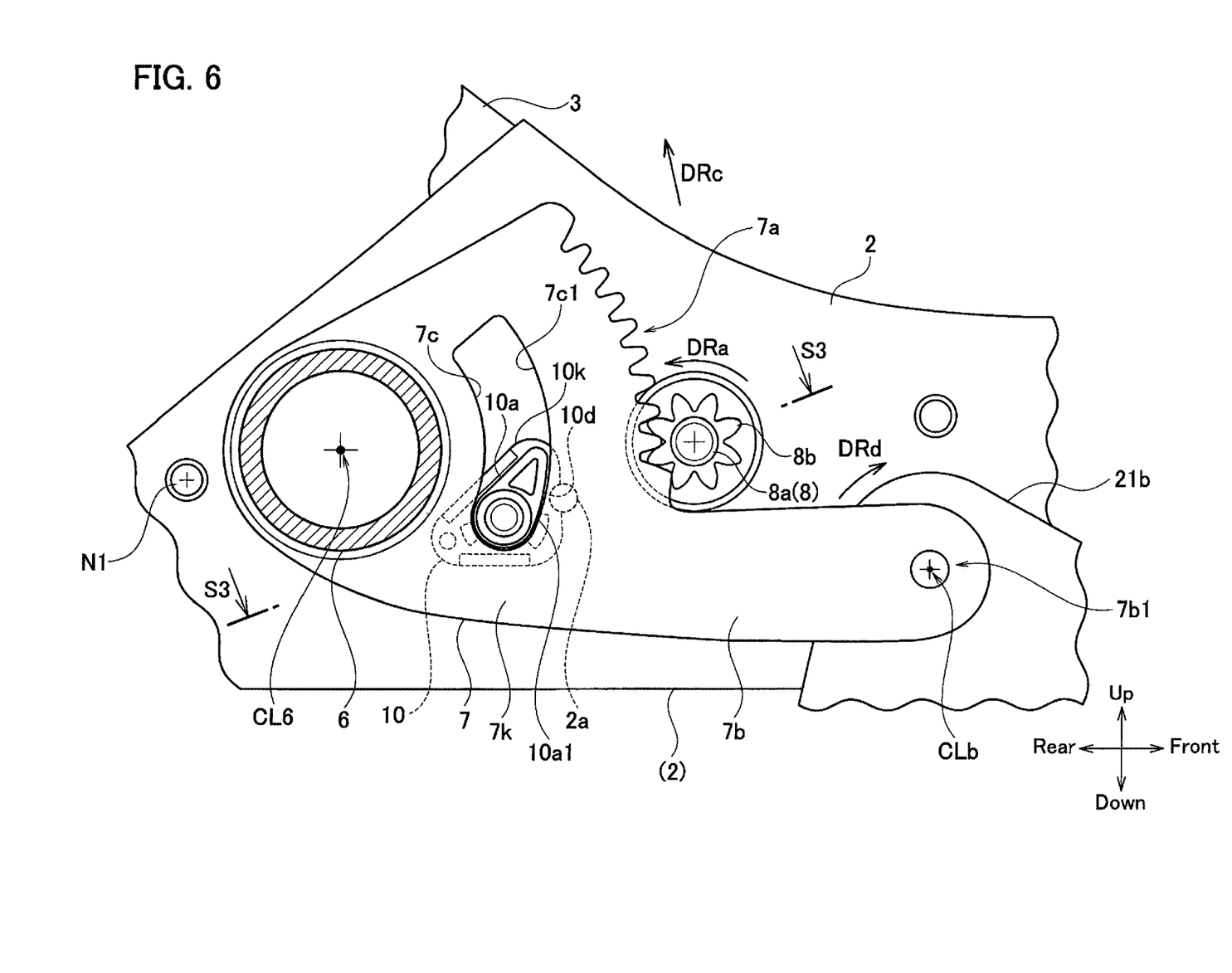
FIG. 6 is a partial right side view showing a state of having a cover 9 removed at a lowered position of the seat ST for explaining the seat lifter structure LK.

FIG. 6 is a view of a vicinity of the sector 7 in the seat lifter structure LK, viewed from a left side in a state of having the cover 9 removed.

As shown in FIG. 6, the spacer 10 is fastened and fixed by the screw N2 as a pin 2a provided on the side frame 2 is engaged with respect to the concave portion 10d.

Consequently, a posture of the spacer 10 with respect to the side frame 2 is not changing.

As the spacer 10 has a shape as described above and fastened together by the screw N2, a distance La of the gap Da in a width direction between the side frame 2 and the sector 7 at a portion fastened by the screw N2 becomes the thickness t10k of the base portion 10k of the spacer 10.

Also, as the thickness t10a of the protruding portion 10a of the spacer 10 is set to be larger than the thickness t7 of the sector 7, even when the screw N2 is fastened by an excessive fastening force, a friction force in the thickness direction to prevent a movement of the protruding portion 10a sliding within the opening portion 7c will not occur.

As shown in FIG. 2 and FIG. 3, in correspondence to a portion 7k1 between the opening portion 7c and the gear portion 7a in the base portion 7k of the sector 7, a bead portion 9a protruding to a left side is formed on the cover 9. A protruding height Δt9a of the bead portion 9a is set to be equal to or slightly smaller than the protruding height t10c of the ring shaped protruding portion 10c.

Consequently, in a state where the cover 9 is fastened together by the screw N2, the portion 7k1 is contacting with the bead portion 9a of the cover 9 without pressing, or in a state of facing in proximity with each other to an extent of having a slight gap.

As shown in FIG. 2, on the rail 61 installed on the floor surface C1 of the vehicle body C, a movable rail 21 is engaged and supported to be capable of moving in a front and rear direction.

On a rear portion of the movable rail 21, a rear support portion 21b protruding upward is formed.

The rear support portion 21b is supporting the sector 7 to be capable of rotating around an axial line CLb extending in a width direction at a support portion 7b1 at a tip end of an arm portion 7b.

To a front portion of the movable rail 21, one end side of a rink bar 22 is attached to be capable of rotating around an axial line CLf extending in a width direction.

Another end side of the rink bar 22 is attached to be capable of rotating around an axial line CLf2 extending in a width direction, at a front support portion 2f on a front portion of the side frame 2.

Namely, the side frame 2 is supported with respect to the movable rail 21, with a front side supported via the link bar 22 connected to be capable of rotating with respect to the movable rail 21, and a rear side supported via the sector 7 and the pinion 8b engaged with the sector 7.

A state shown in FIG. 2 and FIG. 6 is a state in which the pinion 8b is engaged at a lowermost position of the gear 7a of the sector 7, and the cushion seat ST1 is at a lowermost position in the raising/lowering operation in this state.

In this state, when the passenger repeatedly operates the raising/lowering lever (not shown in the figure), for example, the pinion 8b is rotated stepwise, in a counter-clockwise direction in FIG. 6 (see an arrow Dra).

This rotation of the pinion 8b is not limited to ones caused by the passenger, and may be carried out by a motor. To be concrete, in an embodiment in which a lifting motor is provided and its output shaft is connected to the shaft portion 8a, the shaft portion 8a and the pinion 8b may be rotated in a forward or reverse direction by an operation of the lifting motor.

The sector 7 is at a lowermost side in a possible range for rotating around the axial line CLb in FIG. 6, and allowed to rotate only in a clockwise direction.

For this reason, in conjunction with the rotation of the pinion 8b in an arrow Dra direction, the pinion 8b itself is relatively raised along the gear portion 7a.

Figure 7:
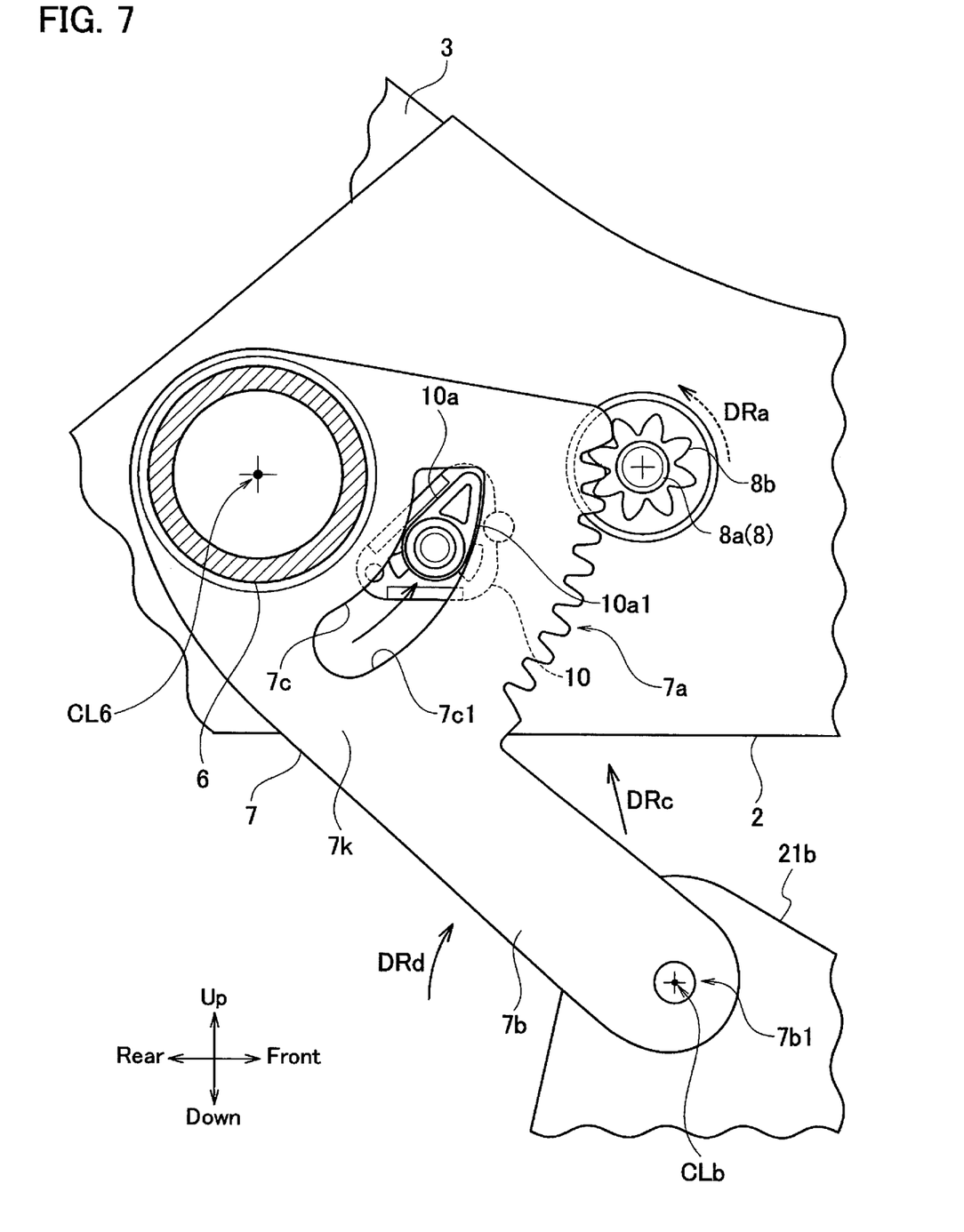
FIG. 7 is a partial right side view showing a state of having the cover 9 removed at a raised position of the seat ST.

By this, the sector 7, that is fixed at a support portion 7k2 to the rear portion shaft 6 supported to be capable of rotating with respect to the side frame 2, is rotated in the clockwise direction around the axial line CLb (see an arrow DRd), and the side frame 2 with the brake unit 8 fixed thereto is raised (see an arrow DRc) (see also FIG. 7). FIG. 7 is showing a state in which the side frame 2 is raised to an upper end position in a possible range for a raising/lowering movement.

In coordination with the raising of the side frame 2 due to the rotation of the sector 7 around the axial line CLb, the link bar 22 is also rotated, and as a result, the cushion seat ST1 is raised with respect to the movable rail 21 along with the seat back ST2.

A lowering of the seat ST will be an operation reverse to this.

In the raising/lowering operation of the side frame 2 between a lower end state shown in FIG. 6 and an upper end position shown in FIG. 7, the protruding portion 10a of the spacer 10 that is entered into and engaged with the opening portion 7c of the sector 7 will slide and move within the opening portion 7c.

The raising/lowering operation of the side frame 2 has a raising upper bound with respect to the sector 7 regulated as the protruding portion 10a abuts an upper end of the opening portion 7c, and a lowering lower bound with respect to the sector 7 regulated as the protruding portion 10a abuts a lower end of the opening portion 7c.

In the configuration as described above, the seat lifter structure LK is configured by including at least the side frame 2, the brake unit 8 having the pinion 8b fixed to the side frame 2, the sector 7 having the gear portion 7a engaged with the pinion 8b and the arc shaped opening portion 7c, the spacer 10 having the base portion 10k present between the side frame 2 and the sector 7 and the protruding portion 10a that is entered into and sliding within the opening portion 7c, and the cover 9 that is covering the portion 7k1 of the sector 7 and fastened together with the spacer 10 with respect to the side frame 2.

In the seat lifter structure LK, the spacer 10 is present between the sector 7 and the side frame 2 in a width direction (left and right direction) and no gap is occurring.

For this reason, the side frame 2 and the sector 7 are substantially integrated in a thickness direction such that a bending rigidity becomes higher.

By this, the side frame 2 and the sector 7 are hard to cause the bending deformation in the case where a large force to a rear side is exerted to the seat back ST2, so that a displacement in a relative position between the side frame 2 and the sector 7 is hard to occur.

Consequently, the engagement of the pinion 8b of the brake unit 8 fixed to the side frame 2 and the gear portion 7a of the sector 7 is maintained in a good state.

Also, the base portion 10k of the spacer 10 is made to abut to a circumferential edge of the opening portion 7c of the sector 7 by surfaces.

By this, substantially, the integrated state of the sector 7 with respect to the side frame 2 is secured similarly as in the case of abutting by surfaces, so that the bending rigidity of the side frame 2 and the sector 7 is further improved.

Also, the edge surface portion 10a1 of the protruding portion 10a and the outer edge 7c1 of the opening portion 7c are formed with the same curvature, such that the protruding portion 10a of the spacer 10 that is entering into and engaged with the opening portion 7c of the sector 7 will slide while abutting to the outer edge 7c1 by surfaces.

For this reason, it is made such that the stress concentration at a contacting portion of the spacer 10 and the sector 7 is hard to occur.

By this, in the case where a large force to a rear side is exerted on the side frame 2 and a force is transmitted to the sector 7 via the spacer 10, it is made such that a local deformation is hard to occur in a surrounding of the protruding portion 10a of the spacer 10 and the opening portion 7c of the sector 7.

Consequently, the bending deformation is hard to occur in the side frame 2 and the sector 7 in this respect as well, and a displacement in a relative position between the side frame 2 and the sector 7 is hard to occur.

Also, on the cover 9, the bead portion 9a that is contacting with or facing in proximity with the base portion 7k is formed at a portion corresponding to the base portion 7k of the sector 7.

By this, the inner side deformation (a right side deformation in FIG. 2 and FIG. 3) of the sector 7 when a force for bending to the inner side is exerted to the sector 7 is regulated by the bead portion 9a, so that the bending deformation of the sector 7 is suppressed.

From these facts, in the seat lifter structure LK and the seat ST equipped with the same, even when a large force to a front side is exerted on the seat back ST2, the engagement of the gear portion 7a of the sector 7 and the pinion 8b of the brake unit 8 is maintained in a good state. Also, the bending deformation of the side frame 2 and the sector 7 is prevented. Therefore, the fall down of the seat back ST2 to a front side can be prevented.

The present invention is not to be limited to the embodiments explained above, and can be modified variously within a range of not digressing from the essence of the present invention.

A mechanism for raising or lowering the side frame 2 is not limited to a method for rotating the pinion 8b of the brake unit 8 stepwise. It may be made to be a configuration in which the side frame 2 is raised or lowered by some other mechanism and the pinion 8b and the gear portion 7a are engaged to simply effectuate the braking.

An example in which the seat lifter structure LK is provided on a left side of the cushion seat ST1 has been described, but it may be provided on a right side in a left and right symmetric structure.

The invention claimed is:

1. A seat lifter structure for raising or lowering a cushion seat by raising or lowering a side frame built into the cushion seat with respect to a fixing member, the seat lifter structure comprising:
   a brake unit comprising a pinion and being attached to the side frame;
   a sector supported to be rotatable with respect to the fixing member around an axial line by a first support portion, the sector supported to be rotatable with respect to the side frame via a second support portion, the sector having a gear portion to be engaged with the pinion, and the sector provided in parallel with to and facing the side frame; and
   a spacer having a first surface facing the side frame and a second surface facing the sector, the spacer being installed between the side frame and the sector, wherein the sector has an arc-shaped opening portion centered around the second support portion, the spacer being attached to the side frame, the spacer having a base portion and an elongated protruding portion protruding from the base portion in a tear drop shape in a plan view when viewed from a direction of the axial line, wherein a first end of the elongated protruding portion is rounded and the elongated protruding portion tapers to a point at a second end, the elongated protruding portion to be entered into and engaged with the arc-shaped opening portion, and the elongated protruding portion having an edge surface portion, and a part of which extending along a longitudinal direction of the tear drop shape providing a surface-to-surface contact with an end surface on an outer edge portion of the arc-shaped opening portion.

2. A seat lifter structure in accordance with claim 1, further comprising a cover fixed with respect to said side frame such that said cover covers said sector, said cover having a bead portion protruding to contact with or face in proximity with a surface of said sector.

3. A vehicle seat mounted on a vehicle and having a cushion seat and a seat back, the vehicle seat comprising:
   a seat lifter structure attached to a rail fixed on a floor of the vehicle and to be raised or lowered with respect to the rail, the seat lifter structure comprising:
      a brake unit comprising a pinion and attached to the side frame;
      a sector supported to be rotatable with respect to the rail around an axial line by a first support portion, the sector supported to be rotatable with respect to the side frame via a second support portion, the sector having a gear portion to be engaged with the pinion, and the sector provided in parallel with to and facing the side frame; and
      a spacer having a first surface facing the side frame and a second surface facing the sector, the spacer being installed between the side frame and the sector, wherein the sector has an arc-shaped opening portion centered around the second support portion, the spacer being attached to the side frame, the spacer having a base portion and an elongated protruding portion protruding from the base portion in a tear drop shape in a plan view when viewed from a direction of the axial line, wherein a first end of the elongated protruding portion is rounded and the elongated protruding portion tapers to a point at a second end, the elongated protruding portion to be entered into and engaged with the arc-shaped opening portion, and the elongated protruding portion having an edge surface portion, and a part of which extending along a longitudinal direction of the tear drop shape providing a surface-to-surface contact with an end surface on an outer edge portion of the arc-shaped opening portion.

4. A vehicle seat in accordance with claim 3, wherein the base portion is in an approximately triangular shape in the plan view, and the elongated protruding portion protrudes from the base portion between a central portion and one corner portion of the base portion.

5. A vehicle seat in accordance with claim 3, wherein said seat lifter structure further comprises a cover fixed with respect to said side frame such that said cover covers said sector, said cover having a bead portion protruding to contact with or face in proximity with a surface of said sector.

6. A seat lifter structure in accordance with claim 1, wherein the base portion is in an approximately triangular shape in the plan view, and the elongated protruding portion protrudes from the base portion between a central portion and one corner portion of the base portion.

7. A seat lifter structure for raising or lowering a cushion seat by raising or lowering a side frame built into the cushion seat with respect to a fixing member, the seat lifter structure comprising:
   a brake unit comprising a pinion, said brake unit being attached to said side frame;
   a sector supported by a first support portion, wherein said sector is rotatable about a rotation axis with respect to said fixing member, said sector being supported via a second support portion, wherein said sector is rotatable with respect to said side frame, said sector having a gear portion to be engaged with said pinion, said sector being parallel to said side frame and said sector facing said side frame;
   a spacer having a first surface facing said side frame and a second surface facing said sector, said spacer being arranged between said side frame and said sector, said sector having a sector surface defining an opening, said sector surface extending in an axial direction with respect to said rotation axis, said spacer being attached to said side frame, said spacer having a base portion and a protruding portion protruding from said base portion, at least a portion of said protruding portion being arranged in said opening, said protruding portion having an outer surface portion, said outer surface portion being in direct contact with said sector surface, one side of said base portion being in direct contact with said side frame and another side of said base portion being in direct contact with said sector, said one side of said base portion being located opposite said another side of said base portion;

a cover fixed with respect to said side frame such that said cover covers said sector, said cover having a bead portion protruding to contact with or face in proximity with a surface of said sector, said spacer being in direct contact with said cover.

8. A seat lifter structure in accordance with claim 7, wherein the opening comprises an arc-shaped opening portion centered around the second support portion.

9. A seat lifter structure in accordance with claim 8, wherein the protruding portion is an elongated protruding portion, wherein the elongated protruding portion protrudes from the base portion in a tear drop shape in a plan view when viewed from a direction of the axial line, wherein a first end of the elongated protruding portion is rounded and the elongated protruding portion tapers to a point at a second end, wherein a part of the outer surface portion extends along a longitudinal direction of the tear drop shape.

10. A seat lifter structure in accordance with claim 7, wherein said sector surface extends radially about said protruding portion with respect to said rotation axis.

11. A seat lifter structure in accordance with claim 7, wherein said spacer is fixed to said sector and said side frame via a fastener.

12. A seat lifter structure in accordance with claim 11, wherein said spacer comprises a through opening, at least a portion of said fastener being arranged in said through opening.

13. A seat lifter structure in accordance with claim 7, wherein said cover is fixed to said side frame via a fastener.

14. A seat lifter structure in accordance with claim 13, wherein said spacer is fixed to said sector and said side frame via said fastener.

15. A seat lifter structure in accordance with claim 14, wherein said spacer comprises a through opening, at least a portion of said fastener being arranged in said through opening.

16. A seat lifter structure in accordance with claim 7, wherein said cover is in direct contact with said protruding portion.

\* \* \* \* \*